United States Patent [19]

Braun

[11] 4,378,468

[45] Mar. 29, 1983

[54] METHODS AND APPARATUS FOR ALLEVIATING SOUND-COUPLED FEEDBACK IN CONFERENCE ROOM SOUND SYSTEMS

[75] Inventor: Daryl P. Braun, Harvard, Ill.

[73] Assignee: Darome, Inc., Harvard, Ill.

[21] Appl. No.: 195,799

[22] Filed: Oct. 10, 1980

[51] Int. Cl.$^3$ .............................................. H04M 1/20

[52] U.S. Cl. ............................ 179/1 CN; 179/1 DM; 179/1 FS

[58] Field of Search ............. 179/1 CN, 1 FS, 1 DM, 179/1 AT, 1 HF, 1 MF, 1 P, 1 E, 81 A, 81 B

[56] References Cited

U.S. PATENT DOCUMENTS

| | | | |
|---|---|---|---|
| 3,992,586 | 11/1976 | Jaffe | 179/1 AT |
| 4,078,155 | 3/1978 | Botros et al. | 179/1 CN |
| 4,184,048 | 1/1980 | Alcaide | 179/1 CN |
| 4,237,339 | 12/1980 | Bunting et al. | 179/1 CN |

FOREIGN PATENT DOCUMENTS

| | | | |
|---|---|---|---|
| 1477141 | 6/1977 | United Kingdom | 179/1 E |

*Primary Examiner*—Joseph A. Popek
*Attorney, Agent, or Firm*—Leydig, Voit, Osann, Mayer & Holt, Ltd.

[57] ABSTRACT

A method and apparatus for alleviating sound-coupled feedback in a conference room having a conference table for the seating of human participants, the room sound system including one or more loudspeakers for outputting amplified sound from a given source in sufficient volume for all to hear plus one or more microphones for picking up the voice of any given participant. By locating the loudspeaker(s) below the board-like table top, preferably at floor level attached to the table foot structure, and by locating the microphone(s) above the table top, preferably in the central region, sound waves from the loudspeaker(s) are directed with high efficiency coupling to the participants' ears, but are constrained by the table top to "feedback" to the microphone(s) only with low efficiency coupling. "Rain barrel" effects are reduced. The invention finds advantageous use in purely local conference room sound amplification systems and in teleconferencing systems.

12 Claims, 4 Drawing Figures

FIG. 1.
(PRIOR ART)
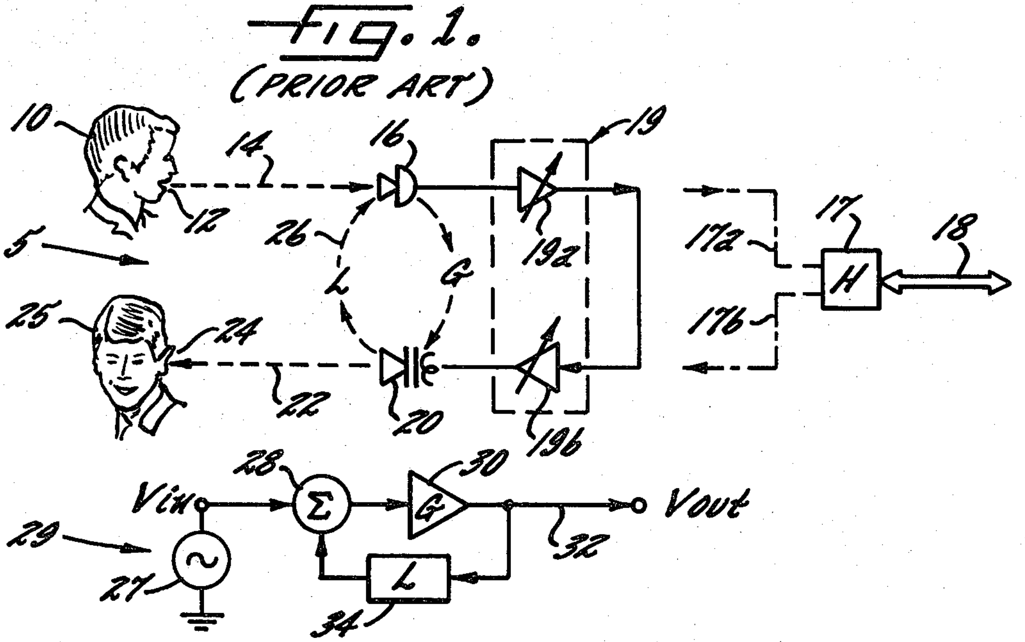
$$V_{out} = G\left[V_{in} + L \cdot V_{out}\right] \quad (36)$$
$$f = \text{LOOP GAIN} = GL \quad (38)$$
$$H(s) = \frac{V_{out}}{V_{in}} = \frac{G}{1-GL} = \frac{G}{1-f} \quad (40)$$
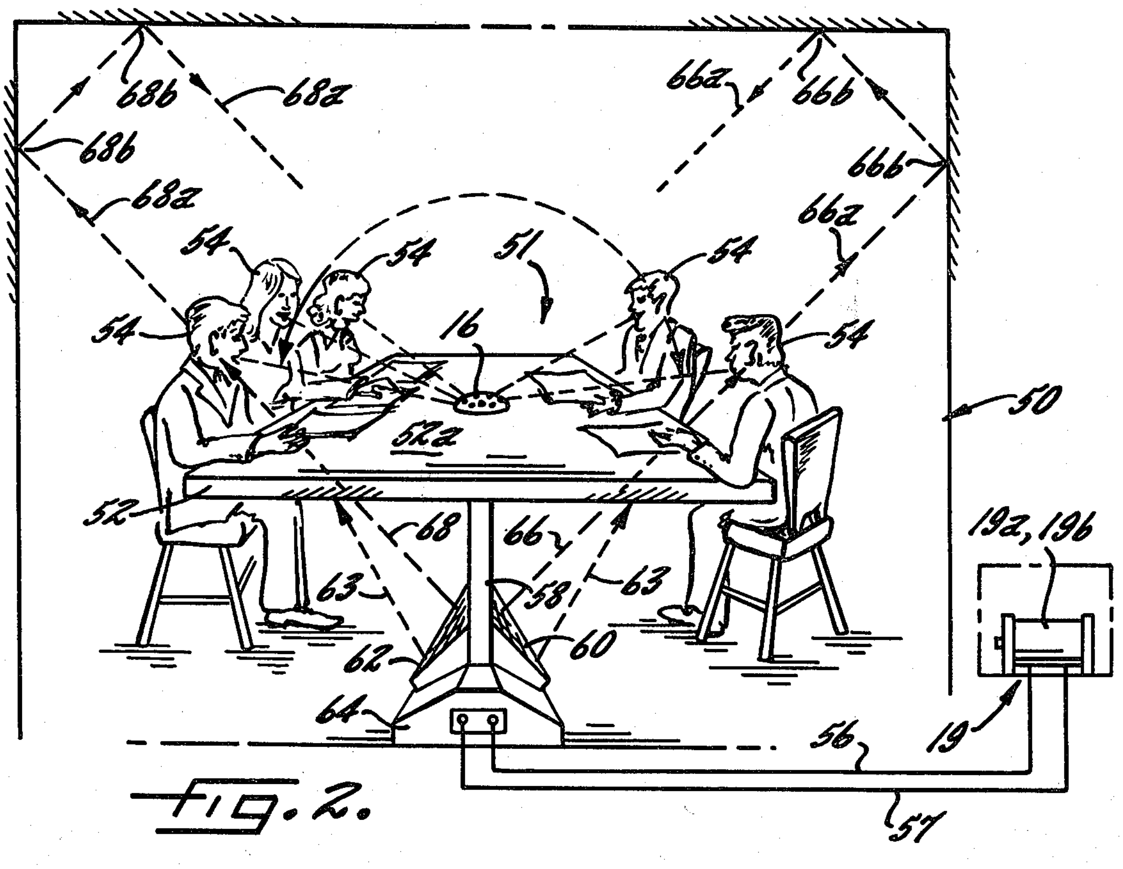
FIG. 2.

FIG. 3.
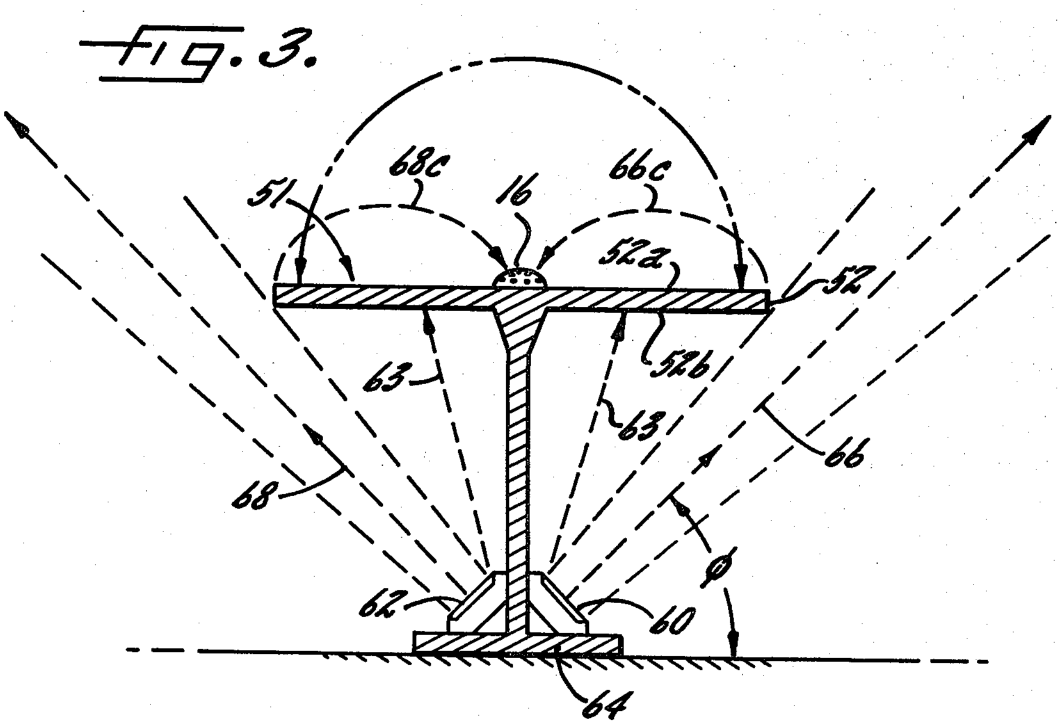
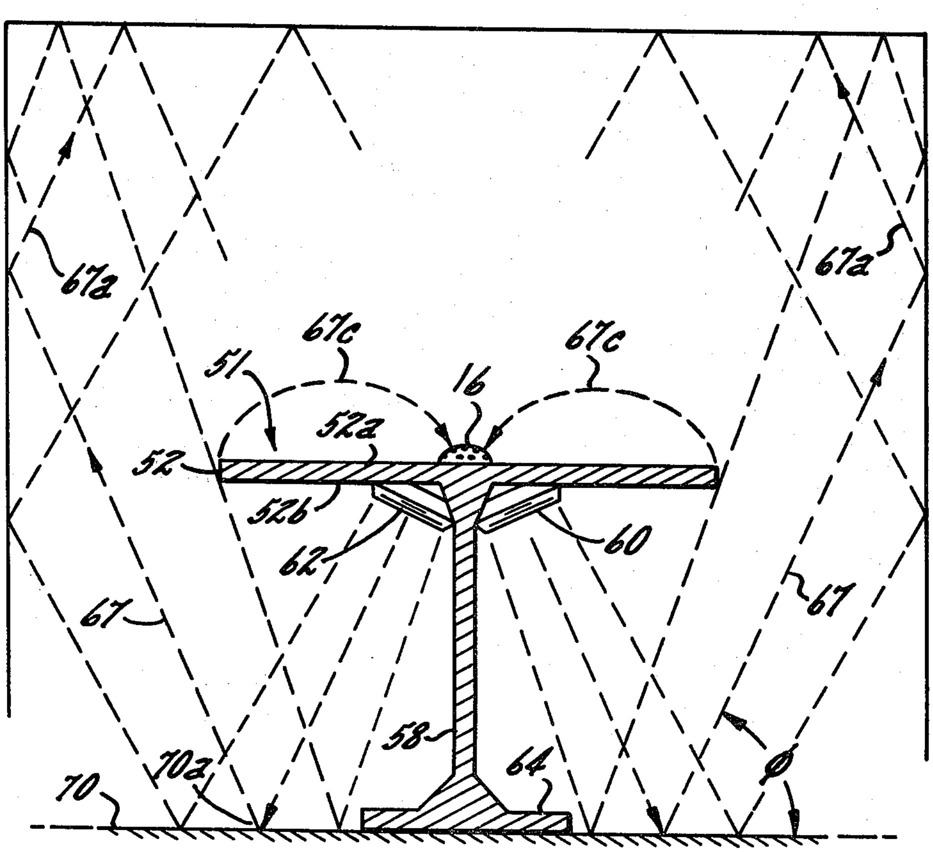
FIG. 4.

METHODS AND APPARATUS FOR ALLEVIATING SOUND-COUPLED FEEDBACK IN CONFERENCE ROOM SOUND SYSTEMS

BACKGROUND OF THE INVENTION

1. Field of the Invention

This invention relates to conference rooms having sound pick-up and sound amplification systems. More particularly, the invention pertains to conference room installations which include one or more microphones for picking up the voices of human participants and one or more loudspeakers driven by electronic amplifiers, either to ensure that all participants can adequately hear the remarks of one speaking participant, or for communication with distant persons over telephone or intercom lines. Specifically, the invention relates to a method and apparatus for alleviating sound-coupled feedback from the loudspeaker(s) to the microphone(s), which has been a long-standing problem observed in the use of such conference room sound systems.

2. Description of the Prior Art (Prior Art Statement Under Rule 97)

U.S. Pat Nos. 2,580,439 (Kock, 1952); 3,992,586 (Jaffe, 1976) and 4,078,155 (Botros et al, 1976) all disclose sound systems that could be used in conference rooms and recognize feedback from loudspeakers to microphones as a plaguing problem. Jaffe teaches that the loudspeakers should direct their emitted sound toward the participants, and preferably the microphones should be located equidistant from loudspeakers driven 180° out-of-phase so as to produce nulls at the locations of the microphones. The severity of the feedback problem is illustrated by the effort in designing electronic circuitry to deal with it. See U.S. Pat. Nos. 2,736,771 (Hanson), 3,588,352 (Yamawaki) and 3,784,747 (Berkley et al).

U.S. Pat. No. Des. 154,143 (Reed) issued June 14, 1949, shows loudspeakers placed underneath the top of a table, presumably for outputting music or radio entertainment programs, but with no microphone involved and thus no feedback problem.

SUMMARY OF THE INVENTION

The general aim of the invention is to provide a direct and effective method and apparatus for reducing feedback in conference room sound systems.

It is also an object of the invention to provide a method and apparatus for alleviating sound-coupled feedback in conference rooms which have either local or teleconference sound systems.

Moreover, it is an object of the invention to provide an arrangement for reducing conference room sound feedback, and which may be used supplementally with currently known electronic circuit methods so as to achieve a high degree of feedback suppression.

In accordance with the present invention, a conference room sound system has one or more loudspeakers placed below the board-like top of a conference table and one or more microphones placed above or on the table top. Direct path propagation of sound from the loudspeakers to the microphones is blocked by the table top, acting as a baffle to reduce feedback. Feedback of sound from loudspeaker to microphone is attenuated by the increased path length, and attenuation at reflection points may be further enhanced by sound-absorbing material on the walls and ceiling of the conference room. The conference table does not, however, obstruct direct path propagation from the loudspeakers to the participants since the loudspeakers may be placed at the floor level or secured to the table support, and oriented to emit sound directly or by a primary floor reflection path, upwards to the participants' ears. The conference table not only serves its normal role as a working surface for the participants but also participates synergistically as a major element in alleviating sound-coupled feedback.

Since the invention reduces feedback by insertion of an obstacle or series resistance to the feedback path, the feedback reduction is in addition to and does not interfere with other methods of feedback reduction such as driving two opposing speakers 180° out-of-phase and locating the microphone equidistant from them at the resulting null, or employing feedback reduction features in the electronic amplifier circuits associated with the microphones and loudspeakers.

BRIEF DESCRIPTION OF THE DRAWINGS

FIG. 1, labeled PRIOR ART, is a diagrammatic illustration of the known, classical feedback problem in a conference room sound system;

FIG. 2 is a diagrammatic, partially perspective view of the preferred embodiment of the invention;

FIG. 3 is a vertical cross-section of the table, loudspeaker and microphone which appear in FIG. 2; and FIG. 4 is a cross-sectional view of an alternative embodiment of the invention having loudspeakers mounted directly beneath the top of the conference table.

DESCRIPTION OF THE PREFERRED EMBODIMENT

Turning now to the drawings, FIG. 1 schematically shows a conference room sound system, generally designated 5, in terms of a classical feedback circuit. The speaking human participant 10 is the source of voice sound vibrations 12 which propagate along path 14 to a microphone 16. The microphone converts received sound vibrations to electrical signals which may be directly amplified by adjustable gain amplifiers **19*a*, 19*b* (collectively designated 19) driving a loudspeaker 20 which outputs sound waves over a path 22 to the ears 24 of several other human participants, one being illustrated at 25. In this case, the source of amplified sound from the loudspeaker 20 is within the conference room and typically is the voice of a human speaker 10**.

Alternatively, however, the sound system 5 may be hooked up via a telephone line (a) to an individual using a remotely located telephone set (not shown) or (b) to another substantially identical sound system (not shown) in a remotely located second conference room. For this purpose, the amplifier **19*a* feeds the input 17*a* of an hybrid 17 and the hybrid output 17*b* feeds input signals to the amplifier 19*b*. The hybrid 17 sends signals over a telephone line 18 to a remote hybrid (not shown) the remote counterpart of amplifier 19*b*(not shown), and routes signals incoming over line 18, from remote counterparts (not shown) of the microphone 16 and amplifier 19*a*, to the loudspeaker 20 via amplifier 19*b*. In this case, the source of amplified sound from loudspeaker 20 is the voice of a participant picked up by the telephone mouthpiece or microphone at the remote location. As noted below, if sound from the loudspeaker 20 feeds back to the microphone 16**, the human listeners at both the local and remote sites may be subjected to an oscillating howl or more likely an annoying reverberation or "rain barrel" effect.

In either case, at least some sound vibrations may feed back from the loudspeaker 20 to the microphone 16 via a coupling path 26 (with similar feedback coupling at the remote conference room in the second case discussed above). The significant parameters for characterizing the effect of feedback are the transmission characteristic L of the feedback path 26 and the gain G of the electrical amplifier circuit including the microphone 16, amplifiers 19, and speaker 20. Electrically, the system may be viewed as a model generally designated 29 which includes a signal source 27 producing a voltage $V_{in}$ which is added in a summing junction 28 to the feedback signal from a feedback network 34 having a transfer characteristic L. The sum is amplified by amplifier 30 of gain G and appears on line 32 as an output voltage Vout. The system model 29 may be analyzed in terms of equations 36 and 38 resulting in the overall transfer characteristic H(s) of equation 40, showing that the critical parameter is the loop gain f, defined in equation 38 as the product of the feedback path transmission L, and the overall sound amplification G. When the loop gain f is equal to 1, the system theoretically has infinite gain and is thus unstable. The instability first occurs at some critical frequency and results in loop oscillation and the familiar audible howl or whistle.

More troublesome in a practical sense, however, is the fact that even when the loop gain is less than one; feedback causes signficant frequency distortion of the amplified sound. At some frequencies the loop gain f is positive and amplification at these frequencies is enhanced, while at other frequencies f may be negative and the overall transfer characteristic is reduced. The loop gain f, in fact, is a periodic function of frequency since for a fixed physical distance between the loudspeaker 20 and microphone 16, the phase of the feedback signal differs depending on whether the physical distance is an integral or half integral number of sound wavelengths at a given frequency. The aural response to such distortion is the same as if the conference room had acoustically reflective walls, tending to form nodes and antinodes for various frequencies at the location of the hearer. Persons unfamiliar with the technical aspects of feedback may tend to blame the conference room architecture or tend to believe that the electrical components of the sound system are of poor quality. Thus, feedback has two undesirable aspects; the sound amplification gain G is desirably to be made high but is absolutely limited at the point where the system becomes unstable, and for lower but practical values of gain G the frequency response of the system is distorted and perceived as poor conference room acoustics. The usual complaint is often phrased as involving a "rain barrel" sound effect.

Attempts to reduce sound-coupled feedback require a reduction in the transmission characteristic L of the feedback path 26. Typically, this has been partially achieved by elaborate baffles to isolate the microphone 16 from loudspeaker 20 and by reducing microphone sensitivity or amplifier gain to an almost intolerably low level. In a large conference room with several participants spaced over a large distance, these approaches have not adequately solved the problem, especially when only one or two microphones are used for a large number of participants. Other curative attempts have involved driving a plurality of speakers 20 out-of-phase so that feedback from the speakers 20 tends to cancel at the location of the microphone, or electronically deriving a signal which is fed to the input of amplifier 19 but which is equal and opposite to the external feedback signal, tending to cause cancellation. All three of these methods may be used collectively in a high-performance system which thus becomes expensive and burdened with a large number of complex components.

In accordance with the present invention, an improved configuration of conference room components interacts with the electrical components 16, 19, 20 to achieve a substantial reduction in feedback and a corresponding increase in acoustic fidelity. As shown in FIG. 2, a conference room 50 is equipped in the usual fashion with a conference table generally designated 51 around which human participants 54 are seated. Voice sounds uttered by the participants 54 propagate directly to a centrally located hemispherical microphone 16 affixed to or supported by the upper surface 52*a* of the board-like top 52 of the conference table 51. In the case of a long conference table, a number of parallel-connected microphones placed along the length of the table may be used to equalize the pick-up from the various participants. Electrical signals from the microphone 16 are carried by wires 56 (which may or may not be concealed) to an audio amplifier 19*a* in an amplifier console or assembly 19 which includes an audio amplifier 19*b* coupled by wires 57 to one or more loudspeaker assemblies. The sound signals fed to the speaker or speakers originate either from one of the participants 54 via the microphone 16 or from a remote telephone mouthpiece or conference room microphone via a telephone line—as explained above with reference to FIG. 1.

In achieving the advantages of the invention, the loudspeaker or speakers 60, 62 are located and oriented beneath the table top 52 in such fashion that (a) the table top itself forms a barrier against direct travel of sound from the speakers to the microphone 16 and (b) the transmission of sound from the speakers to the ears of seated human participants is enhanced or optimized. For conference tables supported by four corner legs, the elongated speaker or speakers 60, 62 may simply be laid on the floor beneath the table, preferably near or along an imaginary vertical plane passing through the longitudinal centerline of the table. In the preferred but not essential practice of the invention as shown in FIGS. 2 and 3, those loudspeakers are affixed to or supported by a central, underlying foot structure 64 of the conference table 51. In either arrangement the speaker or speakers are aimed to direct emanating sound waves at an upwardly inclined angle toward the outer edges of the table top 52 and primarily along lines 66, 68 which pass near the heads and ears of the seated human participants 54. The aural perception of participants is relatively good even when the intensity (volume) of the loudspeaker outputs is relatively low.

Sound waves 63 from the speaker assemblies 60, 62 are blocked by the table top 52 from traveling directly into the region of the microphone 16. The sounds passing generally along the upwardly inclined lines 66, 68 reach the microphone 16 only after travel along the elongated paths represented at 66*a*, 68*a* which include one or more reflection points 66*b*, 68*b* at the walls and/or ceiling of the conference room. Both the length and the reflections of these paths result in diffusion and attenuation of the sound so that undesired pick-up of speaker-produced sound is greatly reduced. This, taken with the fact that the proximity of the paths 66, 68 to the participants' ears permits a lesser speaker volume to be adequate, vastly decreases the soundcoupled feedback which otherwise would occur if loudspeakers were located haphazardly in the room, for example, on the table 51 itself or in the corners or along the wall-ceiling junction of the room.

As an alternative embodiment, the loudspeaker assemblies may be affixed to or located near the lower surface 52*b* of the table top 52, as shown in FIG. 4. In this arrangement, the speaker assemblies are preferably but non-essentially elongated; and they are oriented to direct sound waves downwardly toward the floor 70 for reflection upwardly along primary paths 67 which pass near the heads and ears of seated human participants. This alternative embodiment may be desirable in instances where the table top 52 is relatively narrow so that the feet of seated participants might be uncomfortably restricted by or possibly damaging to speakers located at floor level. Sound attenuation due to reflection at the floor points 70*a* is partially compensated by the steeper angle $\phi$ of the primary sound paths 67 which extend in greater proximity to the ears of participants seated very closely to the table 51.

In the event that the conference table is circular or approximately circular (e.g., octagonal) in shape, the basic effects of the arrangements shown by FIGS. 2 and 3 may be obtained by locating one or more loudspeakers beneath the table top and spaced generally around the vertical axis of the table. A single microphone may be supported on the table top itself, generally at that axis, or a plurality of microphones so supported may be located in a circular array centered about that axis. Of course, if an elongated, rectangular conference table is employed as in FIG. 2, a plurality of speakers and a plurality of microphones may be serially spaced along and in or near a vertical plane passing through the longitudinal axis of the table.

The improved conference room sound system achieves a significant reduction in sound-coupled feedback mainly by using the board-like table top 52 (which forms the usual working surface for the participants) synergistically to perform the additional function of isolating the microphone 16 from any substantial short or direct line paths of sound emanating from the speaker or speakers. Feedback is constrained to occur primarily along lengthened, reflective paths 66*a*, 68*a* (FIGS. 2 and 3) or 67*a* (FIG. 4) so feedback sound waves are vastly attenuated by the time they reach the microphone 16. Some sound waves might propagate by knife-edge diffraction around the edges of the table top, as illustrated at 66*c*, 68*c* (FIGS. 2 or 3) and 67*c* (FIG. 4); but here again the intensity of the waves will be attenuated greatly by the time they reach the microphone 16. Thus, the present invention enhances or optimizes sound coupling to conference room participants' ears (permitting lower speaker volumes to be adequate, and therefore reducing the possibility of troublesome feedback) while at the same time attenuating any speaker-produced sound waves which do in fact reach the microphone. Yet, this is accomplished without any added special or complex components beyond the basic items (one or more microphones, one or more loudspeakers, an amplifier, and a table for conferences) employed in the simplest of conference room sound systems.

Certain optional features may, of course, be added to even further reduce feedback. The walls and ceilings of the conference room may be formed or covered with sound-absorbing material so that the reflective paths have an even higher attenuation factor. Also, the central foot structure 64 of the conference room table may be constructed to include a vertical partition 58 (or a separate partition may be added) to keep the sound from each speaker 60 or 62 on its own side of the table;—and the two speakers in this case may be driven out of phase so that some algebraic cancellation occurs in the region of the microphone 16 for even the weak feedback waves which reach that region. Any other feedback reducing techniques, such as electronic circuit cancellation may, if desired, be used in conjunction with the present invention to reinforce and supplement the anti-feedback action which the present invention produces.

The improved conference room sound system need not be limited to applications involving a single conference room. Separate rooms may be interconnected by mixing the microphone inputs of the rooms in parallel and driving all loudspeakers from the common audio amplifier 19. The system is also usable to full advantage in teleconference systems by coupling the microphone 16 output and audio amplifier 19 input to a telephone line 18 using an hybrid circuit 17, as shown in FIG. 1.

While the invention is susceptible of various modifications and alternative constructions, it should be understood that there is no intention to limit the invention to the specific forms disclosed, but on the contrary, the intention is to cover all modifications, alternative constructions and equivalents falling within the spirit and scope of the invention as defined by the appended claims.

What is claimed is:

1. A method of reducing sound coupling from at least one audio loudspeaker to at least one audio microphone in a conference room having a conference table for seating human participants, said loudspeaker reproducing amplified voice sound to be heard by said participants and said microphone sensing voice sounds emitted by said participants, said method comprising:

locating said loudspeaker below the lower surface of the top of said table to direct its emanating sound waves along paths extending through the regions occupied by the heads of said participants seated at said table; and, locating the microphone in a region above the upper surface of the top of said table, shielded by said table from direct path sound propagation from said loudspeaker, and exposed to direct path sound propagation from the regions occupied by the heads of said participants, whereby voice sound coupling from the loudspeaker to the ears of seated participants and voice sound coupling from the mouths of the seated participants to the microphone is substantially optimized while sound coupling from the loudspeaker to the microphone is substantially reduced.

2. The method of reducing sound coupling as recited in claim 1 wherein said loudspeaker is located at approximately floor level beneath said table and said microphone is located at approximately the level of the top working surface of said conference table.

3. The method of reducing sound coupling as recited in claim 2 wherein said conference table is round, said microphone and a plurality of loudspeakers are generally placed around the vertical axis of said conference table.

4. The method of reducing sound coupling as recited in claim 2 wherein said conference table is generally rectangular, and a plurality of microphones and a plurality of loudspeakers are generally located in or near a vertical plane passing through the longitudinal axis of said conference table.

5. The method of reducing sound coupling as recited in claim 2 wherein said conference table includes a central foot structure beneath its top and said loudspeaker is affixed to said central foot structure at approximately floor level.

6. The method of reducing sound coupling as recited in claim 1 wherein said loudspeaker is supported from the lower surface of the top of said conference table and is substantially above floor level.

7. A conference room sound system for directing electronically amplified and reproduced voice sound to human participants located in a conference room, and for electronically receiving voice sound produced by said participants, while minimizing feedback of the electronically reproduced sound comprising:

a conference table for positioning said participants about its periphery and blocking the direct path propagation of sound from regions below the table top to regions directly above the table top;

at least one microphone supported on or near the upper surface of said table top; and at least one audio loudspeaker for reproducing electronically amplified voice sound, located beneath said conference table top and oriented to direct reproduced voice sound along inclined paths upwards to the ears of said human participants;

whereby direct path propagation of sound from the loudspeaker to the microphone is blocked by the conference table itself.

8. The conference room sound system as recited in claim 7 further comprising at least one electronic amplifier for amplifying the signal generated by said microphone and driving said loudspeaker with the amplified signal.

9. The conference room sound system as recited in claim 7 wherein said microphone is located at approximately the level of the top of the working surface of said conference table and is oriented to receive sounds from said participants seated around said table.

10. The conference room sound system as recited in claim 7 wherein said loudspeaker is located at approximately floor level and is aimed to direct emitted sound upwards past the edges of the top of said conference table.

11. The conference room sound system as recited in claim 7 wherein said loudspeaker is located immediately beneath the lower surface of the top of said conference table at approximately the center of the table and is aimed to direct sound downwards at an inclined angle, whereby emitted sound is reflected by the floor of said conference room upwardly past the edges of the top of said conference table.

12. The conference room sound system as recited in claim 7 wherein said conference table is generally rectangular with a generally vertical partition depending from beneath the table top and extending along the longitudinal axis of said conference table, and further comprising at least one audio loudspeaker reproducing said amplified voice sound out-of-phase, said partition extending from the top of said table to the floor of the conference room and serving to acoustically separate said loudspeaker for reproducing said sound from said loudspeaker reproducing said sound out-of-phase.

* * * * *